Nov. 8, 1960  J. Q. ADAMS  2,959,154
SWINE FEEDER
Filed Feb. 4, 1957

Witness.
A. G. Martin

INVENTOR.
John Quincy Adams
BY
M. Talbert Dick
ATTORNEY

United States Patent Office 2,959,154
Patented Nov. 8, 1960

2,959,154

SWINE FEEDER

John Quincy Adams, Clark, Mo.

Filed Feb. 4, 1957, Ser. No. 638,025

8 Claims. (Cl. 119—52)

This invention relates to a pig feeder and more particularly to one that may be used for either large or small swine.

Swine feeders are old in the art, and in general are of two types, i.e., one type for hogs and another type, such as is disclosed in my United States Letters Patent No. 2,708,901, used solely for young pigs. The feeder disclosed in my patent is unique in that it may be placed in the same pen holding the larger hogs and due to its construction the larger hogs will be prevented from eating from its food trough. However, it is not possible of adjustment to selectively classify the size of the pigs to be permitted its use. Also, it cannot be adjusted to permit its use by large hogs.

Therefore, one of the principal objects of my invention is to provide a pig feeder that may be easily and quickly adjusted for selecting by size the pigs that are to be served.

Another object of my invention is to provide a pig creep feeder for the purpose above set out that can be easily moved from place to place and is ready for use at any time.

More specifically the object of this invention is to provide a pig feeder that has a vertically adjustable horizontal bar over its entrance way for controlling the size of the swine eating from the feeder.

A still further object of this invention is to provide a pig feeder which is designed so that the feeding pigs need not stand in the mud or dirt and are protected along with the feed from rain and the like.

Still another object of my invention is to provide a pig creep feeder of the above class that cannot be tipped or tilted either by the pigs or hogs.

These and other objects will be apparent to those skilled in the art.

My invention consists in the construction, arrangement and combination of the various parts of the device, whereby the objects contemplated are attained as hereinafter more fully set forth, specifically pointed out in my claims, and illustrated in the accompanying drawings, in which:

Figure 1:
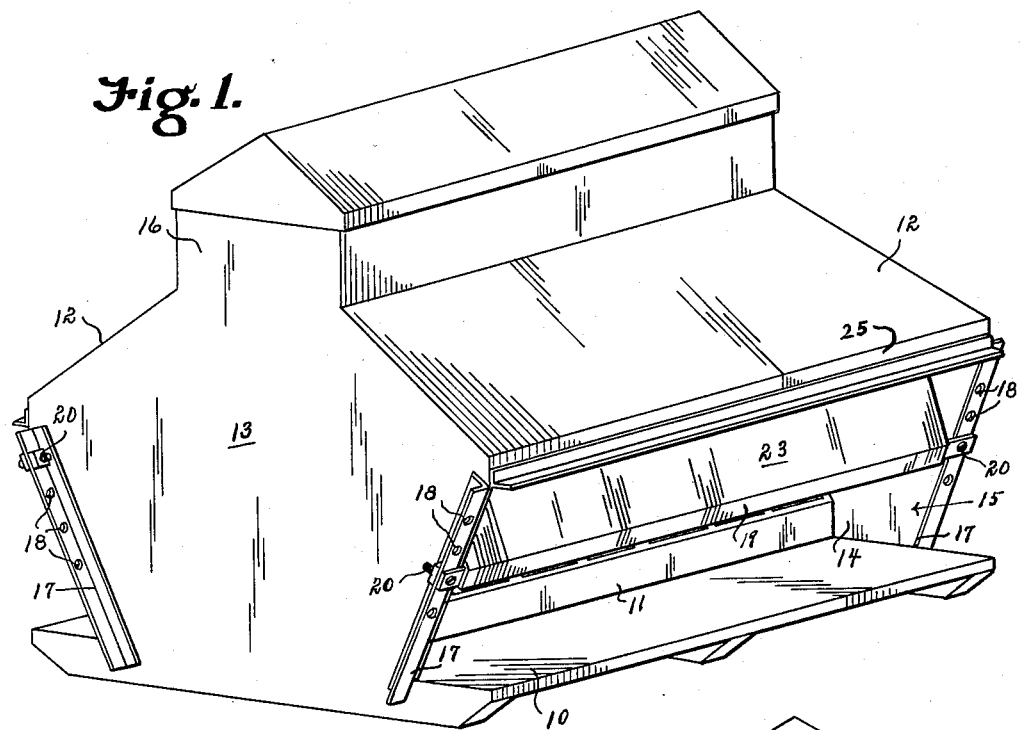
Fig. 1 is a perspective view of my feeder ready for use.
Figure 2:
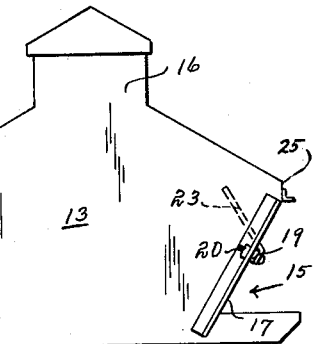
Fig. 2 is a reduced end view of my feeder and more fully illustrates the method of vertical space adjustment for swine selection.

The basic feeder housing features are taught in my herebefore designated patent on pig creep feeders. In general it consists of a horizontal base or flooring 10. In the center of this flooring is the trough 11. Over this trough portion and spaced above the flooring is a roof portion 12, as shown in Fig. 1. At each end of the trough and each end of the floor is a vertical end wall 13 and 14, respectively. These end walls support the roof portion and shield the end portions of the trough 11. The canopy structure portion extends in a horizontal plane spaced above the base to provide a passageway 15 as shown in Fig. 1. One of these passageways 15 will therefore extend between each side roof portion and each side base portion for the entrance of pigs to the open feeding trough. By this construction the pigs may feed from either side of the feeder. The passageways 15 between each of the ends 13 and 14 have a height sufficient to accommodate the large hog. The trough may be serviced from the feed bin portions 16. The structure of the bend portion 16 is substantially the same as the bend portion explained and illustrated in my Patent No. 2,708,901, issued May 24, 1955, on a Pig Creep Feeder. It is to such a housing that I apply my improved pig selector and which I will now describe in detail. As both sides of the feeder are duplicates of the other and are treated alike, I will describe one side, it being understood that a duplicate unit, with duplicate numbers, will be present at the other side of the feeder. Each end wall 13 and 14 has the two side edges 17, as shown in the drawings. These side edges 17 may extend vertically upwardly, upwardly and outwardly, or upwardly and inwardly. Most such hog feeders are made of sheet metal secured to an angle iron or like frame. In the drawings the side edges 17 of the ends are of angle iron thereby providing a free flange, through which I provide a plurality of spaced apart holes 18 as shown in Fig. 2. The numeral 19 designates a horizontal bar. Extending through each end portion of this bar and selectively through a hole 18 in one of the side edge frames 17 is a bolt or pin means 20. Obviously, one of these two bolts 20 engages one hole in the end 13 and the other bolt one hole in the end 14. Diametrically opposed holes should be selected so that the bar, regardless of its elevation adjustment, will be in a horizontal plane and parallel with the floor 10. Obviously, by selecting the proper holes through which to place the bolts, any desired height adjustment of the bar may be had. Thus, even among the smaller pigs, it is possible to lower the bar so that only the very smallest of the group can reach the trough by passing under the bar.

Figure 3:
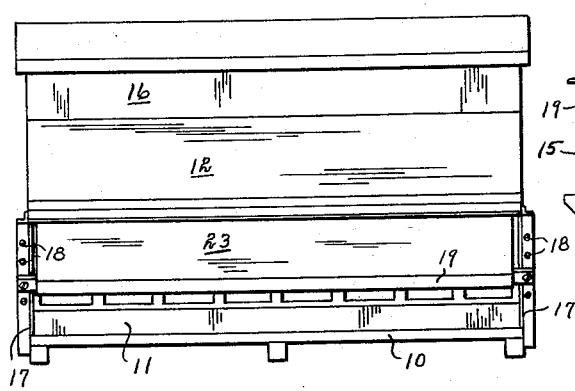
Fig. 3 is a side view of the feeder.

When it is desired to use the feeder for large hogs, the bar is accordingly adjusted upwardly. Centrally placed on the bar is an upwardly extending flange or wall 23, as shown in the drawings. This flange is a baffle wall for at least closing a portion of the space area between the bar and roof portion 12. This is highly desirable to guard against weather and the elements and also to prevent the larger animals from viewing the contents of the feeding trough through the space above the bar. As heretofore noted, the roof portion has a downwardly extending trim 25 and therefore the underside of the roof proper is above the bottom plane of the trim. Therefore, the flange baffle wall 23 extends upwardly and inwardly at an angle so that when the bar is in an elevated adjustment, the baffle wall will be extending inwardly on the trim and thus occupying the dead space under the roof unit, as shown in Fig. 3. The position of the bar may be changed as often as desired.

The older group or groups of pigs may be barred by classification from the very young pigs. Obviously, as each group or size classification of pigs grow up, there comes a time when the raiser desires to separate their feeding from the younger and less strong pigs. This is not only necessary from the standpoint of small pig protection, but feeding habits, feed amounts, and type feeding changes as the pigs get older, larger and stronger. If desired, several pig feeders may be placed in one field, and adjusted to serve different sized pigs. By selecting the proper holes the bar may be lowered or raised for adjusting the vertical space between the base platform and the bar. Once the bolts are all tightened, an effective horizontal selection guard bar above and spaced apart from the platform is provided.

From the foregoing it will be seen why I am separating the swine as to size by vertical restrictive means instead of the herebefore method of using vertical posts or vertical bars which attempt to separate the swine by horizontal restrictions. By eliminating the vertical bars or posts, the larger animals have no perch surfaces for knocking the device laterally. The results is that with may device the pig creep feeder may be placed at any location among all the integrated swine and without destruction. Furthermore, by eliminating vertical bars and like, the small pigs do not become accidentally entrapped but can enter and back out easily and quickly. The two end walls and trough provide the compartment on the center of the platform.

Some changes may be made in the construction and arrangement of my swine feeder without departing from the real spirit and purpose of my invention, and it is my intention to cover by my claims, any modified forms of structure or use of mechanical equivalents which may be reasonably included within their scope.

I claim:

1. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of feed bin, members on said platform extending upwardly and outwardly towards said canopy, a horizontal bar guard operatively adjustably secured to and extending between said members and an upwardly extending baffle wall on said bar guard.

2. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of feed bin, members on said platform extending upwardly and outwardly towards said canopy, a horizontal bar guard operatively adjustably secured to and extending between said members and an upwardly extending baffle wall on said bar guard and capable of extending upwardly into said canopy structure when said bar is in an elevated position.

3. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of feed bin, members on said platform extending upwardly and outwardly towards said canopy, a horizontal bar guard operatively adjustably secured to and extending between said members and an upwardly and inwardly extending baffle wall on said bar guard.

4. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of said feed bin, the side edges of the ends of said feed bin extending beyond the sides of said feed bin and extending upwardly and outwardly between said platform to said canopy, a horizontal bar guard operatively adjustably secured to and extending between the side edges of the opposite ends of said feed bin, and an upwardly extending baffle wall on said bar guard.

5. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of said feed bin, the side edges of the ends of said feed bin extending beyond the sides of said feed bin and extending upwardly and outwardly between said platform to said canopy, a horizontal bar guard operatively adjustably secured to and extending between the side edges of the opposite ends of said feed bin, and an upwardly extending baffle wall on said bar guard and capable of extending upwardly into said canopy structure when said bar is in an elevated position.

6. In a device of the class described, a platform, a feed bin on said platform, an open trough on at least one bottom side portion of said feed bin, a canopy structure spaced above substantially the entire area of said platform, said platform and canopy structure extending horizontally in spaced relationship beyond the sides of said feed bin, the side edges of the ends of said feed bin extending beyond the sides of said feed bin and extending upwardly and outwardly between said platform to said canopy, a horizontal bar guard operatively adjustably secured to and extending between the side edges of the opposite ends of said feed bin, and an upwardly and inwardly extending baffle wall on said bar guard.

7. In a device of the class described, a feed bin, an open trough on at least one bottom side portion of said feed bin, a canopy structure extending outwardly from the sides of the upper portion of said feed bin, members on the outer edge of said canopy extending downwardly and inwardly towards said feed bin, a horizontal bar guard operatively adjustably secured to and extending between said members and an upwardly extending baffle wall on said bar guard.

8. In a device of the class described, a feed bin, an open trough on at least one bottom side portion of said feed bin, a canopy structure extending outwardly from the sides of the upper portion of said feed bin, members on the outer edge of said canopy extending downwardly and inwardly towards said feed bin, a horizontal bar guard operatively adjustably secured to and extending between said members and an upwardly and inwardly extending baffle wall on said bar guard.

References Cited in the file of this patent

UNITED STATES PATENTS

| | | |
|---|---|---|
| 608,863 | Innis | Aug. 9, 1898 |
| 1,257,638 | Robbins | Feb. 26, 1918 |
| 1,469,677 | Naylor | Oct. 2, 1923 |
| 1,894,278 | Martin | Jan. 17, 1933 |
| 2,273,616 | Beatty | Feb. 17, 1942 |
| 2,791,985 | Bragg | May 14, 1957 |
| 2,797,662 | Adams | July 2, 1957 |